United States Patent
Preece et al.

(10) Patent No.: US 6,183,233 B1
(45) Date of Patent: Feb. 6, 2001

(54) APPARATUS FOR MANUFACTURING GOLF CLUB SHAFTS

(75) Inventors: Thomas W. Preece, San Diego; Herb Reyes, Laguna Niguel; J. Andrew Galloway, Escondido, all of CA (US)

(73) Assignee: Callaway Golf Company, Carlsbad, CA (US)

( * ) Notice: Under 35 U.S.C. 154(b), the term of this patent shall be extended for 0 days.

(21) Appl. No.: 09/156,301

(22) Filed: Sep. 17, 1998

Related U.S. Application Data

(63) Continuation-in-part of application No. 08/783,582, filed on Jan. 13, 1997, now Pat. No. 5,820,483.

(51) Int. Cl.[7] .......................... B29C 43/02; A36B 53/10
(52) U.S. Cl. ................. 425/117; 425/468; 425/DIG. 44; 264/271.1; 264/313
(58) Field of Search ................. 249/189; 264/271.1, 264/273, 274, 275, 313; 425/117, 127, 468, DIG. 44

(56) References Cited

U.S. PATENT DOCUMENTS

| | | | |
|---|---|---|---|
| 1,792,852 | 2/1931 | Mattern | 473/312 |
| 2,086,275 | 7/1937 | Lemmon | 473/323 |
| 3,705,931 | * 12/1972 | Confer et al. | 425/525 |
| 3,795,559 | 3/1974 | Horn et al. | 156/172 |
| 4,983,242 | 1/1991 | Reed | 156/172 |
| 5,083,780 | 1/1992 | Walton et al. | 273/80 B |
| 5,165,688 | 11/1992 | Schmidt et al. | 273/80 B |
| 5,198,058 | 3/1993 | You | 156/173 |
| 5,261,669 | 11/1993 | Kochevar | 273/169 |
| 5,262,118 | 11/1993 | Fukushima et al. | 426/512 |
| 5,265,872 | 11/1993 | Tennent et al. | 273/80 B |
| 5,275,399 | 1/1994 | Schmidt et al. | 273/80 B |
| 5,277,423 | 1/1994 | Artus | 273/80 R |
| 5,342,465 | 8/1994 | Bronowicki et al. | 156/175 |
| 5,364,094 | 11/1994 | Easton | 273/72 A |
| 5,413,338 | 5/1995 | Kawamatsu | 273/80 B |
| 5,427,373 | 6/1995 | Kusumoto | 273/80 R |
| 5,429,355 | 7/1995 | Schmidt et al. | 273/80 B |
| 5,465,959 | 11/1995 | Cheng | 273/80 B |
| 5,496,028 | 3/1996 | Chien | 273/80 B |
| 5,534,203 | 7/1996 | Nelson | 264/101 |
| 5,547,189 | 8/1996 | Billings | 473/305 |
| 5,653,646 | 8/1997 | Negishi et al. | 473/319 |
| 5,655,975 | 8/1997 | Nashif | 473/316 |

FOREIGN PATENT DOCUMENTS

| | | |
|---|---|---|
| 2 250 466 | 6/1992 | (GB) . |
| 9117968 | 5/1997 | (JP) . |

\* cited by examiner

*Primary Examiner*—Harold Pyon
*Assistant Examiner*—Thu Khanh T. Nguyen
(74) *Attorney, Agent, or Firm*—Michael A. Catania; Lyon & Lyon LLC

(57) ABSTRACT

Improved methods for manufacturing a shaft for a golf club, devices useful in such methods, and golf club shafts manufactured in accordance with such methods. A plug is detachably affixed to a distal end of a mandrel. A plurality of plies pre-preg composite sheet are wrapped around the mandrel and plug and, thereafter, heated causing the resin comprising the various plies to be cured. The mandrel is then removed from the formed shaft, leaving the plug as an integral part of the distal tip of the shaft.

1 Claim, 5 Drawing Sheets

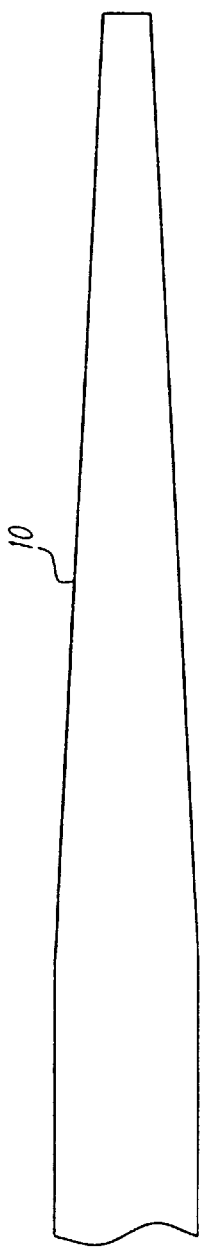
FIG. 1
(PRIOR ART)
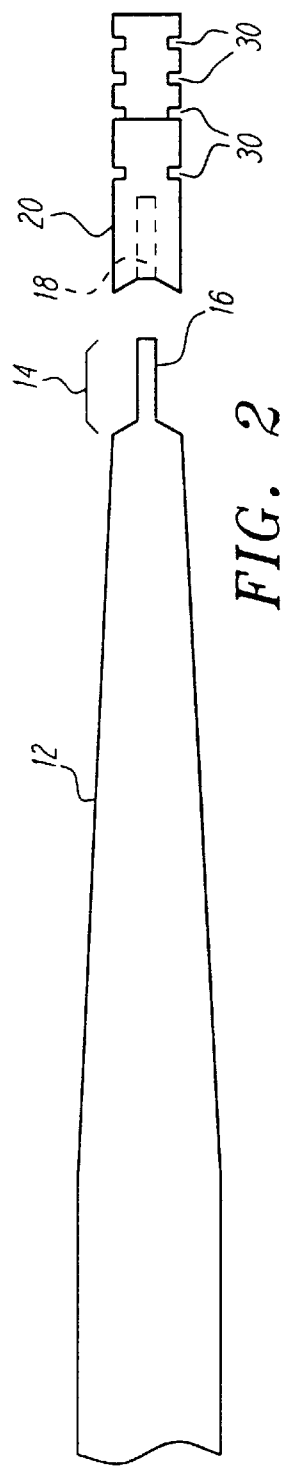
FIG. 2
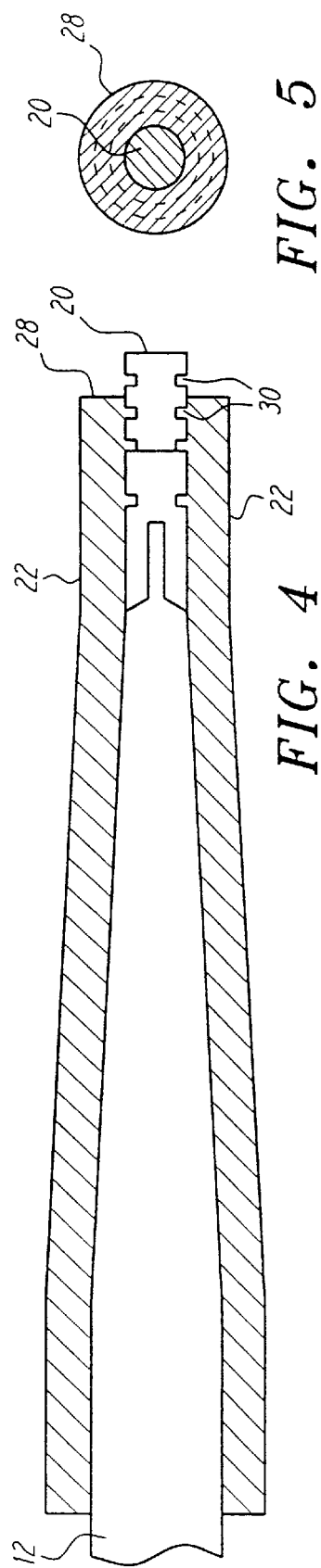
FIG. 5
FIG. 4

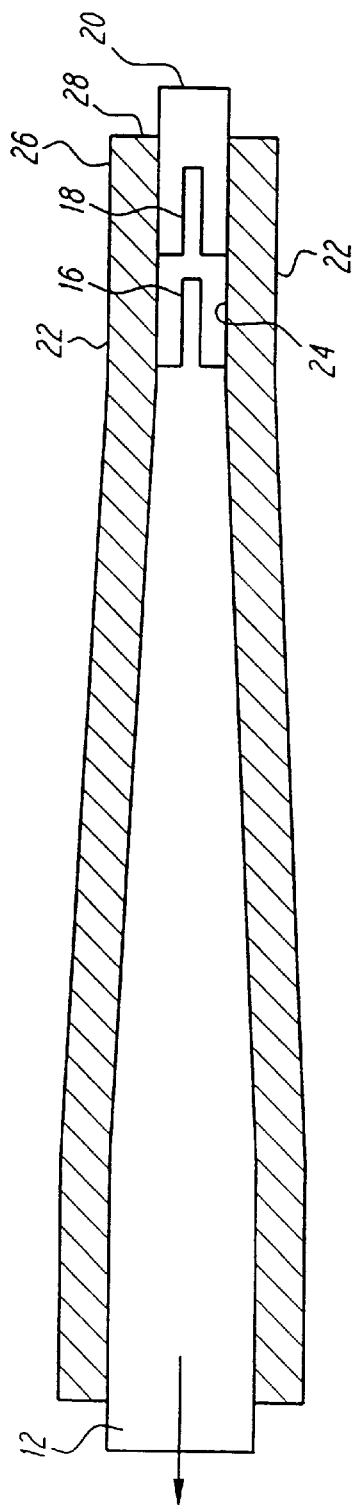
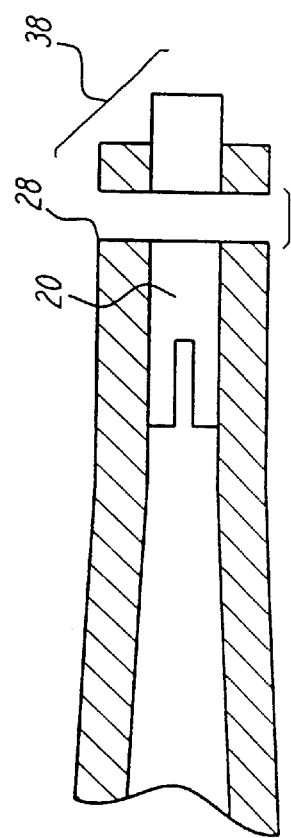
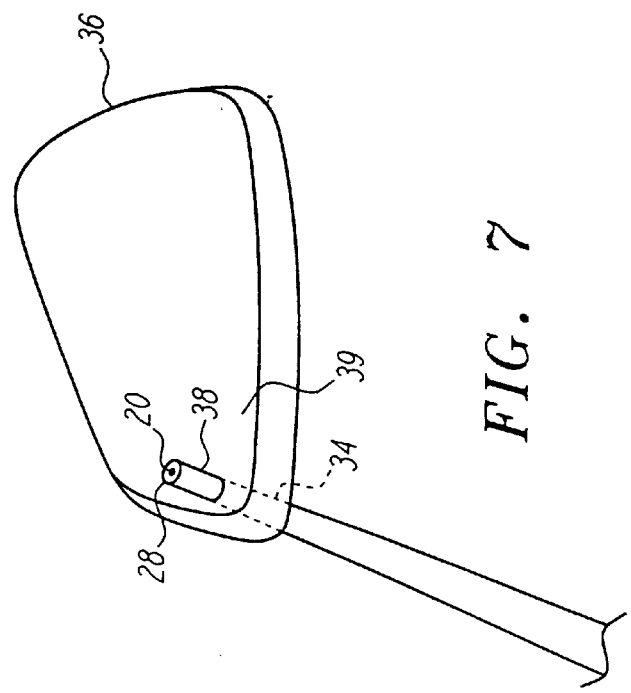
FIG. 6
FIG. 7
FIG. 8

APPARATUS FOR MANUFACTURING GOLF CLUB SHAFTS

CROSS-REFERENCE TO RELATED APPLICATION

This application is a continuation-in-part of co-pending U.S. Application Ser. No. 08/783,582, filed Jan. 13, 1997 now U.S. Pat. No. 5,820,483, and entitled Reduced Weight Golf Club Shafts and Methods of Manufacturing the Same, which is hereby incorporated by reference.

BACKGROUND OF THE INVENTION

The field of the present invention is golf club shafts and, more particularly, reduced weight golf club shafts and methods of manufacturing the same.

Recently, substantial attention has been directed toward the development of lightweight golf club shafts that are manufactured from various composite materials or, more particularly, from a set of plies of "pre-preg" composite sheet. Pre-preg composite sheets are formed by pre-impregnating strands of fiber, for example, carbon or glass, within a binding matrix such as a thermoset epoxy resin or thermoplastic resin. The binding matrix or resin is staged such that it holds the fibers together and forms a malleable sheet.

Numerous shafts are now manufactured by wrapping a set of plies of pre-preg composite sheet around a mandrel in a predetermined manner, wrapping the various plies in a binding material such as cellophane or polypropylene tape, and heating the ply-wrapped mandrel to a predetermined temperature for a time sufficient to allow the resin comprising the plies of pre-preg composite sheet to become fully cured. Once the resin has been fully cured, the binding material may be removed from the exterior of the shaft, and the mandrel may be removed from the core of the shaft. Finally, the shaft may be lightly sanded and painted prior to being inserted into a golf club head.

Through the use of composite materials, it has become possible to manufacture reduced weight shafts for golf clubs, and many shaft manufacturers are now offering for sale ultralight shafts having, for example, a mass less than 70 grams. The extent to which the weight of a shaft may be reduced, however, is limited substantially by the structural requirements that must be met by the tip of the shaft that is affixed within the golf club head. In short, if the walls of the shaft tip are made too thin in an effort to reduce the weight of the shaft, the tip will likely fail or shatter during use. This is particularly true for those golf club head designs that employ a shortened hosel, as such designs provide less structural support for the shaft tip.

It will also be noted that, when a golf club head incorporates a bored-through design whereby the shaft extends through the club head, it is generally necessary to affix a plug in the open end of the shaft tip after the shaft tip has been inserted through the golf club head. This gives the assembled golf club a pleasing cosmetic appearance and, more importantly, prevents debris from entering the shaft tip. However, the use of conventional plugs provides little, if any, structural support to the shaft tip.

Finally, it will be noted that many conventional shaft tips are damaged during trimming processes. Once a shaft is formed, it is common to trim the shaft by removing a segment from both the butt end of the shaft and the tip end. If the walls of the tip are too thin, or if proper care is not taken during the trimming process, serious damage may be caused to the tip during the trimming process.

In view of the many problems that may be encountered in designing and manufacturing reduced weight shafts for golf clubs, it is submitted that those skilled in the art would find improved golf club shafts with reinforced tips and methods of manufacturing such shafts to be quite useful.

SUMMARY OF THE INVENTION

The present invention is directed toward improved methods of manufacturing shafts for golf clubs and to golf club shafts manufactured in accordance with those methods.

In one innovative aspect, the present invention is directed toward a method of manufacturing a shaft for a golf club wherein a plug reinforces and forms an integral portion of a shaft tip. In one such embodiment, a plug is adapted to mate with a distal tip portion of a mandrel. Plies of pre-preg composite sheet may then be wrapped around a portion of the plug and mandrel in a predetermined manner, the plies of pre-preg composite sheet may be wrapped in a binding material such as cellophane or polypropylene tape, and the ply-wrapped mandrel may be heated for a time sufficient to allow the resin in the plies of pre-preg to fully cure. Thereafter, the binding material may be removed from the exterior of the shaft, and the mandrel may be removed from the core of the shaft. The shaft and integral plug may then be trimmed, inserted into a golf club head and affixed within the club head using an epoxy resin. Further, where bored-through head designs are employed, the portion of the plug and shaft tip that extends out from the sole of the club head may be cut off and properly sanded to be flush with the sole. In such instances, a substantial portion of the integral plug preferably will remain within the shaft tip after the protruding portion of the shaft tip has been cut and sanded, thus providing substantial structural support to the shaft tip. The use of an integral plug in accordance with the present invention also facilitates the design and manufacture of reduced weight golf club shafts.

In other innovative aspects, the plug may be formed from a thermally expandable material, and the shaft and integral plug may be manufactured via the cellowrap method described above or via a molding process. In one such embodiment, a bladder may be provided over a mandrel before the plug is fitted onto a male extension provided at a distal tip of the mandrel. Plies of pre-preg composite sheet may then be wrapped around the bladder-covered mandrel and plug in a predetermined manner, and the ply wrapped mandrel and plug may be placed in a mold. If desired, the mandrel may then be withdrawn from the mold leaving the bladder, plug and surrounding plies of pre-preg within the mold. Alternatively, the ply-wrapped mandrel may be left in the mold. In either case, the bladder may be inflated to a predetermined pressure to force the plies of pre-preg against the walls of the mold, and the mold may be heated to a predetermined temperature for a time sufficient to allow the resin comprising the plies of pre-preg to fully cure. Thereafter, the shaft and integral plug may be removed from the mold, the mandrel (if not previously removed) may be removed from the core of the shaft, and the bladder may be removed from the core of the shaft. It will be noted that in such an embodiment, the thermally expansive material comprising the plug will provide not only increased compaction of the plies of pre-preg in the tip region during the curing process, but also substantial structural support in the shaft tip after the curing process has been completed.

In still another innovative aspect, a plug in accordance with the present invention may have one or more hoop ring indentations formed in its exterior surface. In such an embodiment, a shaft may be manufactured in the various manners set forth above. However, during the curing process, resin may be forced into the hoop ring recesses of the plug to more securely affix the plug within the shaft tip.

In still another innovative aspect, the present invention is directed to a mandrel and plug for use in manufacturing a shaft for a golf club. In a preferred form, the mandrel has a distal tip that is notched to form a male extension, and the plug is adapted to detachably receive the male extension. Alternatively, the plug may include a male extension and the distal tip of the mandrel may be adapted to detachably receive the male extension of the plug tip.

Accordingly, it is an object of the present invention to provide improved methods for manufacturing golf club shafts.

It is also an object of the present invention to provide improved golf club shafts and, in particular, reduced weight golf club shafts that are manufactured in accordance with such methods.

It is still another object of the present invention to provide innovative mandrel and plug combinations for use in the manufacture of golf club shafts.

BRIEF DESCRIPTION OF THE DRAWINGS

FIG. 1 is an illustration of a conventional linearly tapered mandrel.

FIG. 2 is an illustration of a mandrel with a male extension and pre-molded plug in accordance with one embodiment of the present invention.

FIG. 4 is a cross-sectional illustration of a plurality of plies of pre-preg wrapped around a mandrel and plug combination in accordance with the present invention.

FIG. 5 is a cross-sectional illustration of a shaft tip and plug in accordance with the present invention.

FIG. 6 illustrates the removal of a mandrel from a shaft and integral plug in accordance with the present invention.

FIG. 7 is an illustration of a shaft inserted through a bored-through golf club head with a portion of the shaft and integral plug extending out from the sole of the club head.

FIG. 8 is a cross-sectional illustration of a shaft tip and integral plug after a trimming operation.

DESCRIPTION OF PREFERRED EMBODIMENTS

Turning now to the drawings, FIG. 1 provides an illustration of a conventional mandrel 10 that may be used during the manufacture of conventional composite golf club shafts. Such shafts may be manufactured, for example, by wrapping plies of pre-preg carbon fiber sheet around the mandrel 10 in a predetermined manner, wrapping the plies in a binding material such as cellophane or polypropylene tape, and heating the wrapped mandrel 10 to a predetermined temperature for a time sufficient to allow the resin comprising the various plies to be fully cured.

Figure 2A:
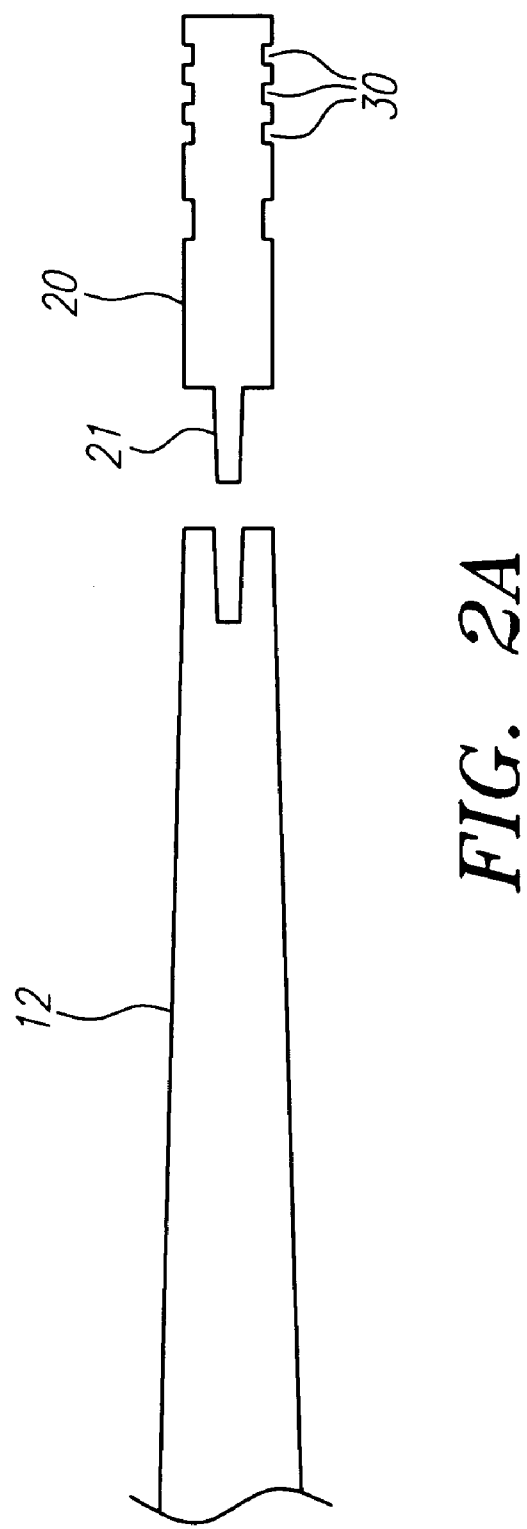
FIG. 2(a) is an illustration of a mandrel and plug, wherein a distal tip of the mandrel is adapted to detachably receive a male extension provided on the plug.

As shown in FIG. 2, a mandrel 12 in accordance with one form of the present invention is generally similar in shape to the mandrel 10 shown in FIG. 1, except that the distal tip 14 of the mandrel 12 is notched to form a male extension 16. The male extension 16 is designed to fit within a central cavity 18 formed in a pre-molded plug 20. In a presently preferred form, the pre-molded plug 20 may be substantially 5 inches in length and may comprise a material that exhibits substantial thermal expansion such as thermally expansive foam, rubber or silicone. Further, it will be noted that once the plug 20 is fitted on the male extension 16 of the mandrel 12, the mandrel 12 and plug 20 combination illustrated in FIG. 2 may have substantially the same dimensions as the mandrel 10 illustrated in FIG. 1. Thus, the mandrel 12 and plug 20 combination may be used to manufacture golf club shafts in all of the ways that the mandrel 10 illustrated in FIG. 1 may be used. It will be understood that in alternative embodiments, a mandrel may be shaped to accept a plug without being notched. For example, as is shown in FIG. 2(a), the plug 20 may be provided with a male extension 21, and the mandrel 12 may be adapted to detachably receive the male extension 21 of the plug 20.

Figure 3A:
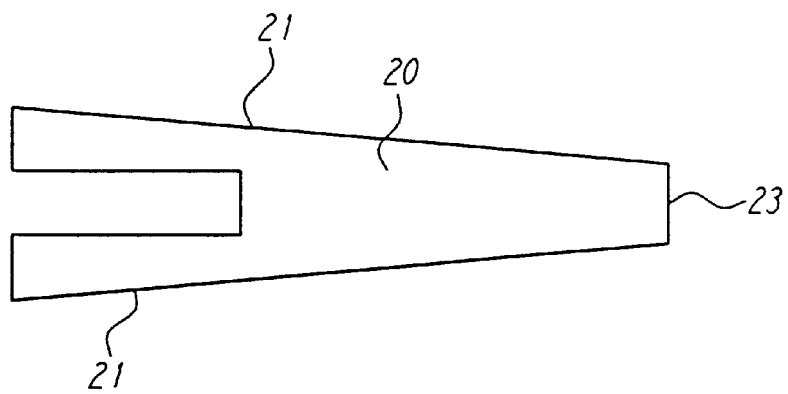
FIG. 3(a) illustrates a pre-molded plug having exterior walls that taper toward the distal tip of the plug.
Figure 3B:
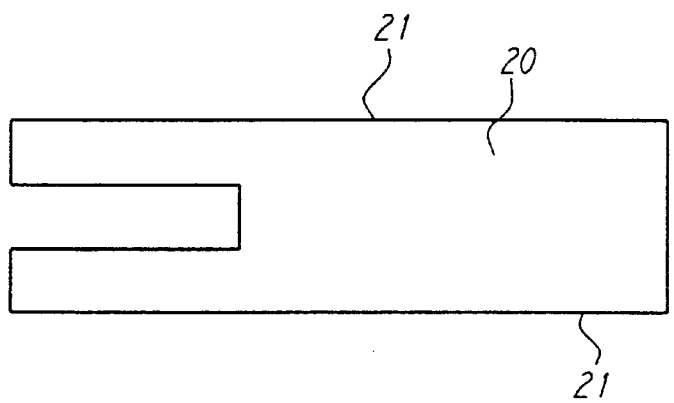
FIG. 3(b) illustrates a pre-molded plug having parallel walls.
Figure 3C:
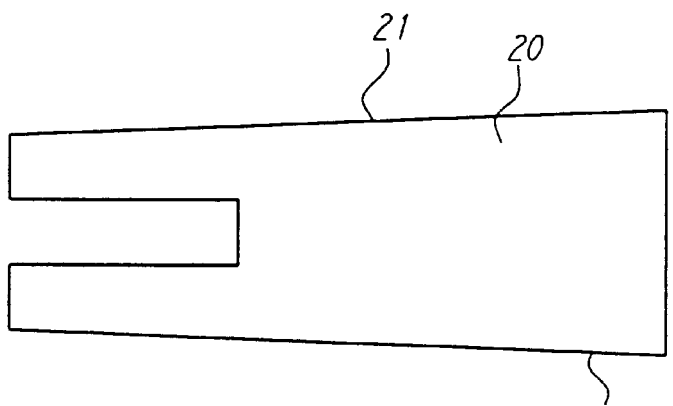
FIG. 3(c) illustrates a pre-molded plug having reverse tapered walls.

In addition, the plug may take several forms. For example, as shown in FIGS. 3(a)–(c), the exterior walls 21 of the plug 20 may be tapered toward the distal tip 23 of the plug 20, the walls 21 of the plug 20 may be configured in a parallel fashion, or the walls 21 of the plug 20 may exhibit a reverse taper.

Figure 6A:
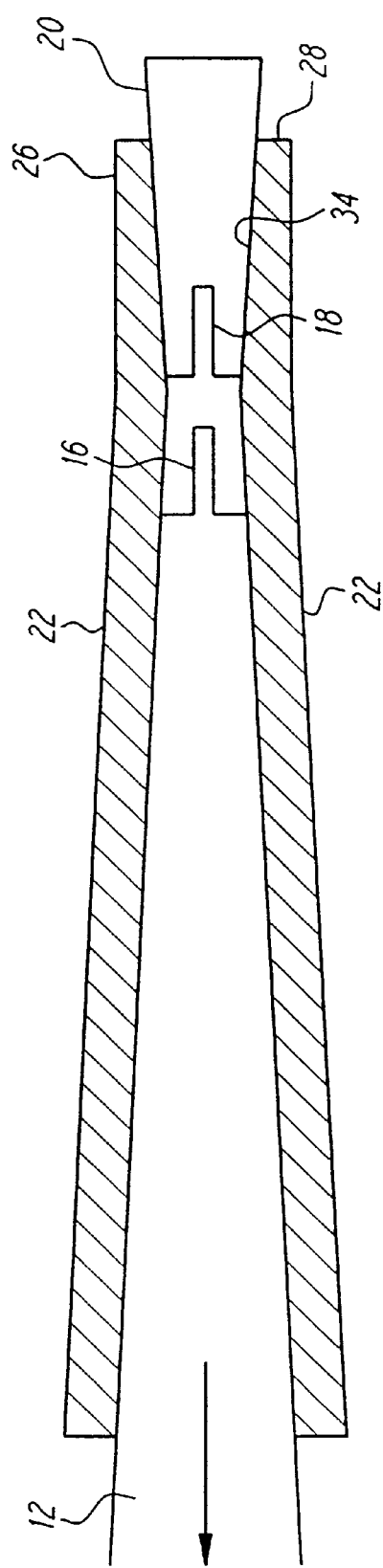
FIG. 6(a) illustrates the removal of a mandrel from a shaft and integral plug in accordance with an alternative embodiment of the present invention.

As shown in FIG. 4, a plurality of plies 22 of pre-preg composite sheet may be wrapped around or "laid-up" on the mandrel 12 and plug 20 combination in a predetermined manner, the plies 22 of pre-preg may be wrapped in a heat shrinkable, binding material such as cellophane tape (not shown), and the wrapped mandrel 12 and plug 20 combination may be heated to a predetermined temperature for a time sufficient to allow the resin comprising the plies of pre-preg to fully cure. Thereafter, the mandrel 12 may be removed from the core 24 of the shaft 26 (as shown in FIG. 6) leaving the plug 20 as an integral portion of the shaft 26. Any portion of the plug 20 that is not fixed within the shaft tip 28 may also be cut away (as shown in FIG. 8). In a preferred form, the plies 22 of pre-preg may comprise pre-preg carbon fiber sheet, and the plies 22 of pre-preg may cover a 1–4 inch section of the plug 20. However, those skilled in the art will recognize that numerous composite materials may be substituted for the carbon fiber, and that longer or shorter plugs may be employed depending upon the overall design of a given shaft.

In another preferred embodiment, the shaft 26 and integral plug 20 may be manufactured via a molding process. In such an embodiment, a bladder (not shown), formed, for example, from latex, rubber or silicone, may be provided over the mandrel 12 before the plug 20 is fitted onto the male extension 16 provided at a distal tip of the mandrel 12. Plies 22 of pre-preg composite sheet may then be wrapped around the bladder covered mandrel 12 and plug 20 in a predetermined manner, and the ply wrapped mandrel 12 and plug 20 may be placed in a mold (not shown). If desired, the mandrel may then be withdrawn from the mold leaving the bladder (not shown), plug 20 and surrounding plies 22 of pre-preg carbon fiber within the mold. Alternatively, the ply-wrapped mandrel 12 and plug 20 combination may be left assembled in the mold. In either case, the bladder (not shown) may be inflated to a predetermined pressure (for example, from 100 to 300 psi) to force the plies 22 of pre-preg against the walls of the mold, and the mold may be heated to a predetermined temperature (for example, to between 250E and 800EF depending upon the resin used) for a time sufficient to allow the resin comprising the plies 22 of pre-preg to fully cure. Thereafter, the shaft 26 and integral plug 20 may be removed from the mold, the mandrel 12 (if not previously removed) may be removed from the core 24 of the cured shaft 26, and the bladder (not shown) may be removed from the core 24 of the shaft 26.

Finally, it will be appreciated that the shaft 26 and integral plug 20 may be manufactured via a filament winding process or via a combination of filament winding and pre-preg wrapping processes. As filament winding techniques are well known in the art, those techniques are not discussed in detail herein. Rather, it is sufficient to understand that filament winding techniques together with resin injection in a molding process may be used to form a shaft 26 and integral plug 20 in accordance with the present invention.

It will be noted that, where the plug 20 is formed from a thermally expansive material, the thermally expansive material comprising the plug 20 will provide increased pressure in the shaft tip 28 during the curing process. This results in tighter compaction of the plies 22 of pre-preg in the shaft tip 28 and reduces the risk that structural defects may develop in the tip region during the curing process. The plug 20 also will provide substantial structural support in the shaft tip 28 after the curing process has been completed.

Turning back to FIGS. 2 and 4, a plug 20 in accordance with the present invention may have one or more hoop ring indentations 30 formed in its exterior surface. In such an embodiment, a shaft 26 may be manufactured in the manner set forth above. However, during the curing process, resin may be forced into the hoop ring recesses 30 of the plug 20 to more securely affix the plug 20 within the shaft tip 28.

As shown in FIG. 7, a shaft tip 28 and integral plug 20 in accordance with the present invention may be inserted into and through a bored-through golf club head 36 such that a distal portion 38 of the shaft 26 and integral plug 20 extends out from the sole 39 of the club head 36. After the shaft 26 is affixed in the club head 36, for example, by bonding with an epoxy resin, the distal portion 38 of the shaft 26 and plug 20 may be cut off and sanded flush with the sole 39 of the club head 36. Of course, in a preferred form, a substantial portion, for example, a 2 to 4 inch section, of the integral plug 20 will remain within the shaft tip 28 after the distal portion 38 of the shaft 26 and plug 20 has been removed or trimmed from the shaft tip 28. This is shown, for example, in FIG. 8.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. An apparatus for utilization in manufacturing a shaft for a golf club from plies of pre-preg, the apparatus comprising:

a cylindrical mandrel having a shape conforming to an interior cavity of a shaft for a golf club, the mandrel having a flat distal end with a cylindrical extension extending therefrom, the cylindrical extension having a diameter that is smaller than the diameter of the cylindrical mandrel; and a plug for integration with a shaft to plug the tip end thereof, the plug composed of a thermally expansive foam, the plug having an interior end, an exterior end and a cavity in the interior end for engaging the cylindrical extension of the mandrel, the plug also having at least one hoop ring indentation on an exterior surface of the exterior end for permanent affixation of the plug to the shaft;

whereby the plug is engaged with the mandrel during formation of a shaft from the plies of pre-preg, the mandrel is removed from the plug after formation of the shaft, and the plug remains in the tip end of the shaft.

\* \* \* \* \*